United States Patent [19]

Seitz

[11] Patent Number: 5,003,615

[45] Date of Patent: Mar. 26, 1991

[54] OPTOELECTRONIC SYSTEM FOR DETERMINING SURFACE IRREGULARITIES OF A WORKPIECE HAVING A NOMINALLY PLANE REFLECTIVE SURFACE

[75] Inventor: Peter M. Seitz, Sellenburen, Switzerland

[73] Assignee: Harris Semiconductor Patents, Inc., Melbourne, Fla.

[21] Appl. No.: 278,400

[22] Filed: Dec. 1, 1988

[51] Int. Cl.$^5$ ............................................. G06K 9/48
[52] U.S. Cl. ..................................... 382/22; 356/376; 358/106; 382/8
[58] Field of Search .................... 382/16, 28, 8, 22, 30; 356/376; 358/101, 106, 107

[56] References Cited

U.S. PATENT DOCUMENTS

| | | | |
|---|---|---|---|
| 4,707,734 | 11/1987 | Labinger et al. | 358/106 |
| 4,783,826 | 11/1988 | Koso | 382/8 |
| 4,792,232 | 12/1988 | Jobe et al. | 382/22 |
| 4,802,759 | 2/1989 | Matsumoto et al. | 356/376 |
| 4,895,448 | 1/1990 | Laird | 356/376 |

Primary Examiner—David K. Moore
Assistant Examiner—Joseph Mancuso
Attorney, Agent, or Firm—K. R. Glick

[57] ABSTRACT

By comparing the distorted image of an edge pattern, such as a checker board pattern, reflected from the surface of a work piece, such as a silicon wafer, and received by a solid state television camera, with a similar image, reflected from the optically flat surface of a calibration piece substituted for the work piece, surface height irregularities, such as warpage, of the work piece can be measured with a high sensitivity and a large dynamic range at relatively low cost.

16 Claims, 4 Drawing Sheets

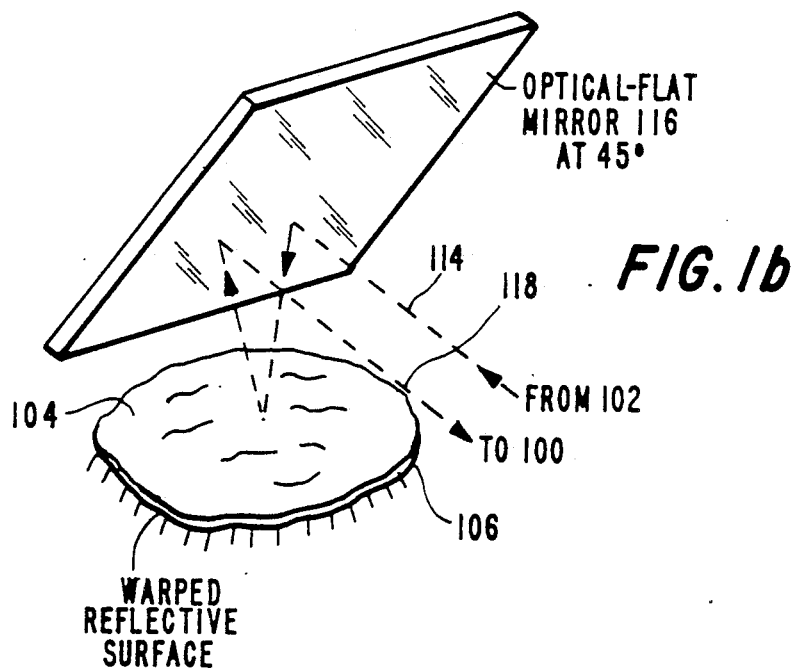
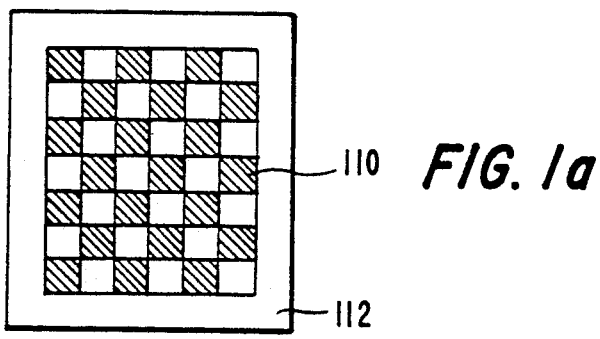
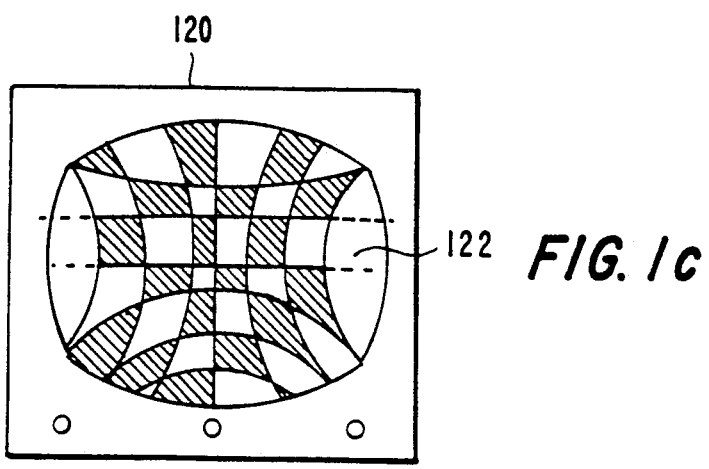

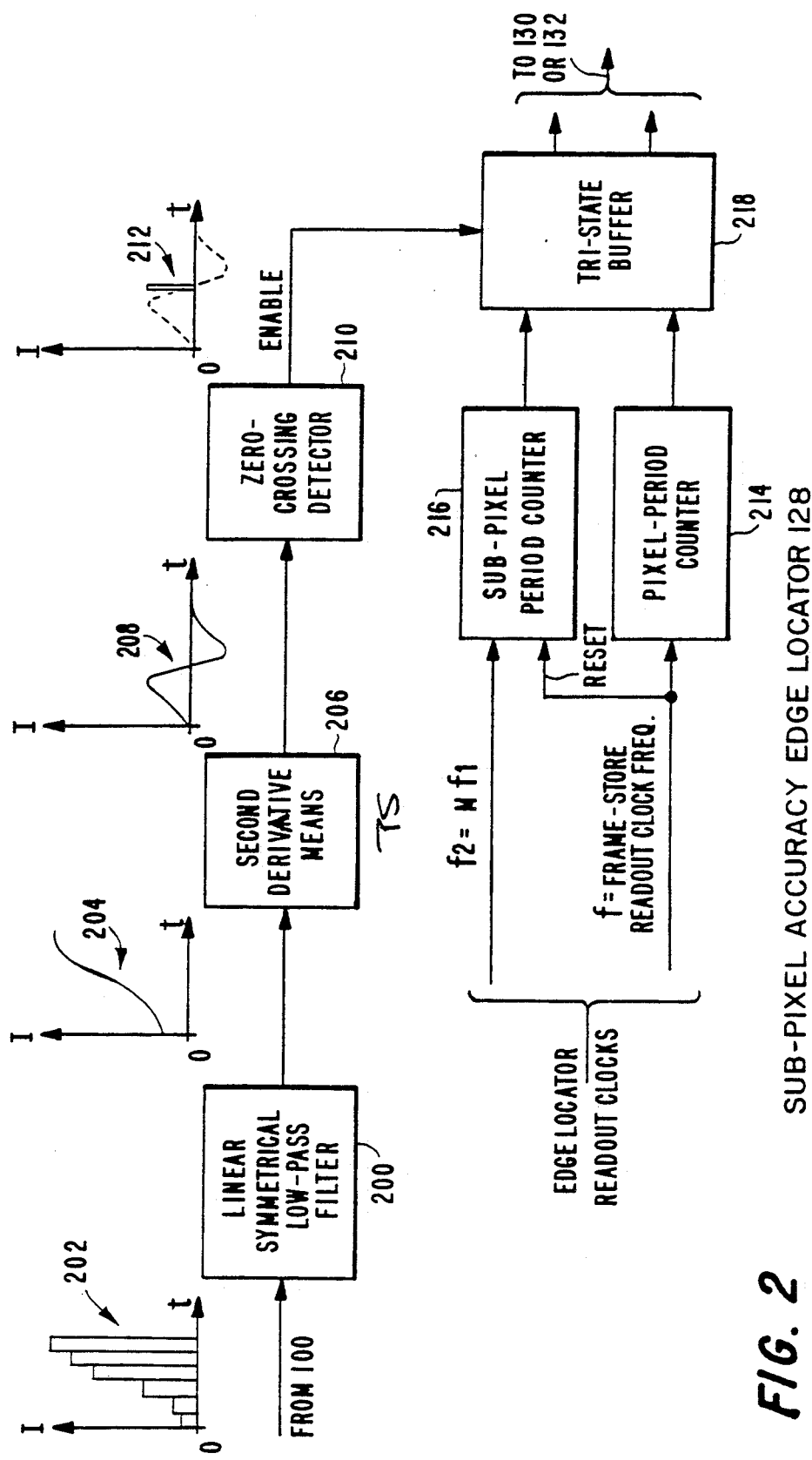

OPTOELECTRONIC SYSTEM FOR DETERMINING SURFACE IRREGULARITIES OF A WORKPIECE HAVING A NOMINALLY PLANE REFLECTIVE SURFACE

BACKGROUND OF THE INVENTION

1. Field of the Invention

This invention relates to optical systems for determining surface irregularities of a workpiece, such as a silicon wafer, having a nominally plane reflective surface.

2. Description of the Prior Art

For certain purposes, it is essential that a workpiece have a substantially flat surface. For instance, in photolithography, such as is used in the manufacture of solid state electronic devices from a silicon wafer, the maximum surface irregularities, such as warpage, that can be tolerated is about 10 micrometers. Various types of optical systems have been developed for determining (e.g., measuring) the surface irregularities of a workpiece having a nominally plane (flat) reflective surface.

One such system employs an interferometer capable of detecting surface irregularities with a precision in height in the Angstrom region. Although this high sensitivity is desirable in the production of optically-flat surfaces, the dynamic range of an interferometer working with visible light is limited to a few micrometers. For such applications as the determination of surface irregularities for a silicon wafer to be used in the manufacture of solid state electronic devices, the sensitivity of an interferometer is higher than is needed and the dynamic range of an interferometer is smaller than is needed.

Non-contact profilers, using scanning techniques and microscopes for generating a height map, have been developed that exhibit both high sensitivity and a large dynamic height range. However, these non-contact profilers are very expensive, costing around $100,000.00.

Other systems have been developed, employing optical imaging, which exhibit relatively large dynamic range, but relatively low sensitivity. One such system, which employs a projection lens to form a defocused image of the surface of a workpiece, such as a wafer, exhibits a sensitivity of only about 15 micrometers (corresponding to a radius of curvature of only one hundred meters). Another such system, in which an image of a known grid pattern reflected from the surface of a workpiece is photographed and the surface irregularities are determined by geometrical distortions of the photographed grid pattern, exhibits a somewhat higher sensitivity of 5–10 micrometers (corresponding to a radius of curvature of 270 meters).

The optoelectronic system of the present invention for determining surface irregularities provides at a relatively low cost a large dynamic range and a high sensitivity. More specifically, the optoelectronic system of the present invention exhibits a sensitivity corresponding to a radius of curvature of 1,000 meters and a dynamic range extending from a radius of curvature of 1,000 meters to a radius of curvature of only 10 meters.

SUMMARY OF THE INVENTION

The present invention is directed to an optoelectronic system comprising a solid state television camera. Such a camera, as is known in the art, includes a solid-state imager comprised of an array of discrete periodically-spaced photosensitive cells, each of which defines a pixel of an image imaged on the imager. Further, such a camera includes means for clocking out a frame of image pixels as an output from the camera.

The optoelectronics system of the present invention further includes first means for imaging on the imager a predetermined light pattern of spaced edges that has been reflected from the reflecting surface of a workpiece. The reflected light pattern travels a given distance from the workpiece to the imager. The minimum distance between adjacent spaced edges of the pattern imaged on the imager is at least three periods of the periodically-spaced photosensitive cells of the imager.

The optoelectronic system of the present invention further includes second means responsive to the respective levels of the clocked-out frame of the imaged pixels that define the image of the predetermined pattern of spaced edges for deriving with sub-pixel accuracy data defining the spacing distance between the proper locations of adjacent imaged edges of the pattern.

Further, the optoelectronic system of the present invention includes third means for storing with sub-pixel accuracy data defining the spacing distance between the proper locations of adjacent image edges of the pattern that had been previously reflected from an optically-flat surface of a calibration piece that had been substituted for the workpiece. Thus, the reflected light pattern travels the same given distance from the calibration piece to the imager as from the workpiece to the imager.

Further, the optoelectronic system of the present invention includes fourth means responsive to the data from the second and third means for determining the non-planar surface irregularities of the workpiece in accordance with the relative values of spacing distance between the proper locations of corresponding adjacent image edges of the workpiece and of the calibration piece.

BRIEF DESCRIPTION OF THE DRAWINGS

FIG. 1a shows a checkerboard pattern that is projected by the edge-pattern light projector of FIG. 1 on the reflective surface of a workpiece;

FIG. 1b illustrates a practical way of illuminating the warped reflective surface of a workpiece, such as wafer, with an edge pattern, such as that shown in FIG. 1a;

FIG. 1c illustrates the distorted image of the checkerboard pattern imaged on the imager of the television camera and displayed by the edge-pattern image centering monitor of FIG. 1, after reflection of the pattern from the warped reflective surface of the workpiece shown in FIG. 1b;

FIG. 2 illustrates an embodiment of a sub-pixel accuracy edge locater means of FIG. 1;

DESCRIPTION OF THE PREFERRED EMBODIMENTS

Figure 1:
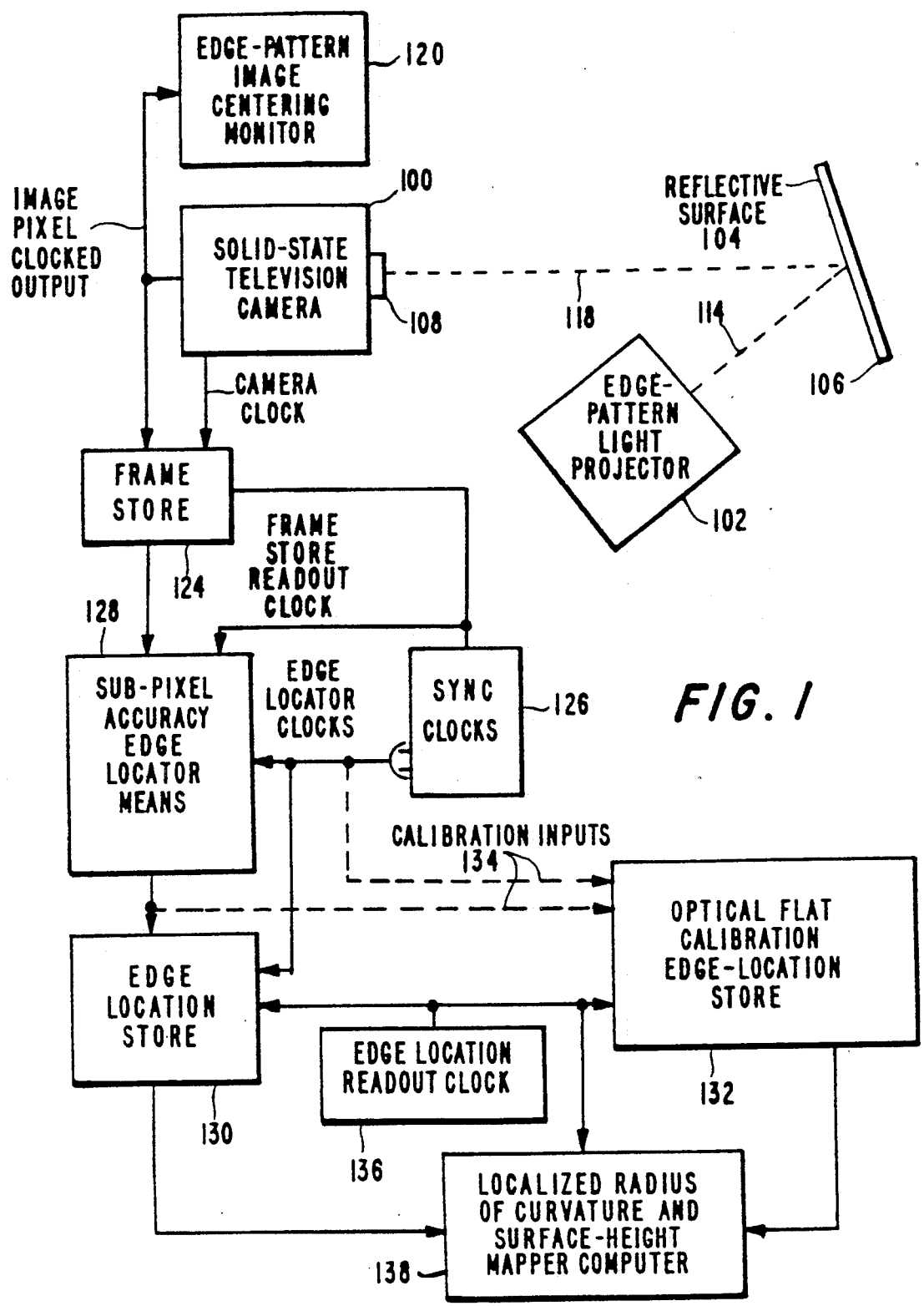
FIG. 1 is a block diagram of an illustrative embodiment of the present invention.

Referring to FIG. 1, there is shown solid state television camera 100. Camera 100, which may be of conventional design, includes a solid state imager comprised of a two-dimensional array of discrete periodically-spaced (e.g., a 16 micrometer period) photosensitive cells arranged in rows and columns. Each of the photosensitive cells (which may be a charge-coupled-device or an MOS device) defines a pixel of any image imaged on the imager. Camera 100 also includes means for clocking out a frame of imaged pixels as an output therefrom, as known in the art.

A predetermined light pattern of spaced edges from edge-pattern light projector 102, after reflection from reflective surface 104 of workpiece 106, is imaged on the imager of camera 100 by camera-objective 108. Preferably, the predetermined light pattern of spaced edges comprises checkerboard pattern 110, shown in FIG. 1a, made up of alternating black and white square elements. Edge-pattern light projector 102 may consist of an inexpensive white light source illuminating a photograph of checkerboard pattern 110 on a transparency 112, shown in FIG. 1a.

FIG. 1b shows a practical way of supporting workpiece 106 (which may be a silicon wafer) with its upper reflective surface 104 (which may be warped) situated in a substantially horizontal plane. As shown in FIG. 1b, incident light beam 114 from edge-pattern light projector 102, situated in a horizontal plane above surface 104 of workpieces 106, is reflected off optical flat mirror 116, oriented at a 45° angle with respect to the horizontal, onto reflective surface 104. This results in reflected beam 118 being restored to a horizontal plane after reflection from mirror 116. As shown in FIG. 1, reflected beam 118 is received by camera 100, whereby, the reflected edge pattern is imaged on the imager of camera 100.

As shown in FIG. 1, the image-pixel clock output from camera 100 is applied as an input to edge-pattern image-centering monitor 120. Assuming that projector 102 projects the checkerboard pattern 110, shown in FIG. 1a, and that reflective surface 104 is warped, as shown in FIG. 1b, the imaged checkerboard pattern 122 displayed by monitor 120 will be distorted, as shown in FIG. 1c. The type and amount of distortion of imaged pattern 122 with respect to that of known regular checkerboard pattern 110 is a function of the type and spatial distribution of the surface irregularities of reflective surface 104 of workpiece 106, as well as any aberrations that may be present in optical-flat mirror 116, television-objective 108 and the imager of solid-state television camera 100. In accordance with the principles of the present invention, the distorted image pattern is employed to determine the surface irregularities of the reflective surface 104 of workpiece 106 in a manner which is independent of the distortions in the imaged pattern due to the aforesaid aberrations in the other elements of the imaging means.

Returning to FIG. 1, frame store 124 has a frame of image pixels clocked out of camera 108 applied as an input thereto under the control of the camera clock. Thus, the two-dimensional imaged checkerboard pattern 122 is stored in frame store 124.

Figure 3:
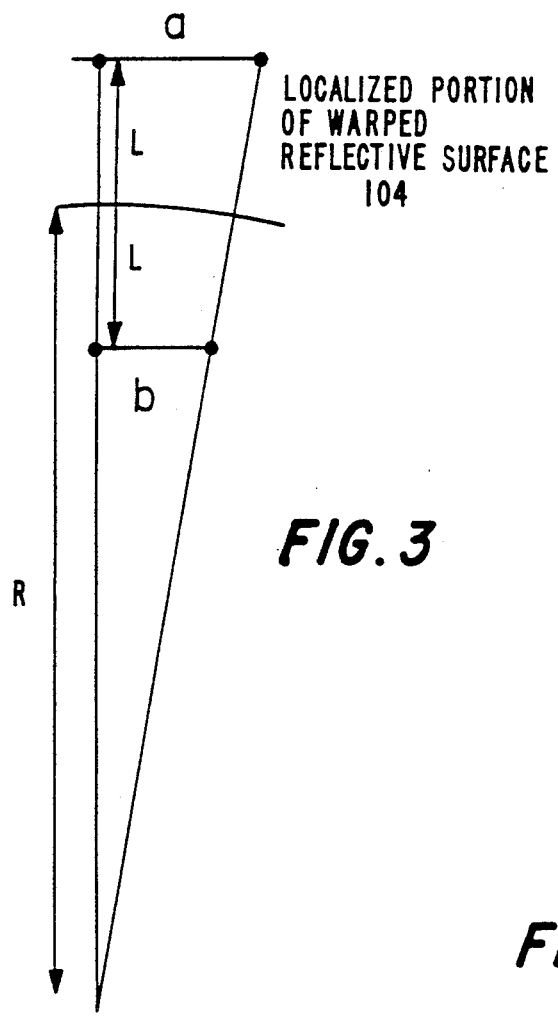
FIG. 3 is a graphic illustration of the relationship between the localized radius of curvature of the workpiece surface irregularities and certain measured parameters associated with the optoelectronic system of the present invention.

Under the control of a frame-store readout clock from sync clocks 126, one of the two-dimensions (row or column, as the case may be) of stored image pixels are read out from frame store 124 and applied as an input to sub-pixel accuracy-edge locator means 128. An embodiment of locator means 128 is shown in FIG. 3, discussed in detail below. All that need be said at this time is that edge-locator means 128, which is responsive to the respective levels of the read out imaged pixel from store 124 generates output data in digital form, under the control of edge-locator clocks from sync clocks 126, which defines with sub-pixel accuracy the proper locations of the edges of the imaged checkerboard pattern in the aforesaid one-dimension thereof. This edge-location digital data is applied as an input to edge-location store 130 from edge-locator means 128 under the control of the edge-locator clocks from sync clocks 126.

In a similar manner, the other dimension (column or row, as the case may be) of the imaged checkerboard pattern pixels stored in frame store 124 are read out and applied to edge-locator means 128, and the digital data output from means 128 defining the proper locations of the imaged pattern edges in this other dimension are applied to edge-location store 130.

Edge-location store 130 digitally stores the data received as an input thereto in a form which defines with sub-pixel accuracy the distance between each pair of adjacent edges of the imaged checkerboard pattern in each of the two dimensions thereof. The respective values of the distance between each pair of adjacent edges of the imaged checkerboard pattern depends on the surface irregularities of the reflective surface 104 of the workpiece 106 then under study (i.e., the distortion in the image of the known checkerboard pattern incident on the reflective surface 104 of the workpiece 106 then under study due to such surface irregularities).

As will be discussed in more detail below, the optoelectronic system of the present invention is initially calibrated with a calibration piece that has an optically flat reflective surface, which calibration piece is substituted for workpiece 106. During the calibration procedure (which need occur only once), the digital data derived at the output of edge-locator means 128, which is associated with the imaged checkerboard pattern reflected from the calibration piece, is applied as an input to optical-flat calibration edge-location store 132 under the control of the edge locator clocks from sync clocks 126 (as indicated by the dashed-line calibration inputs 134) and permanently stored in calibration edge-location store 132.

Under the control of edge-location read-out clock 136, the respective digital data stored in edge-location store 130, relating to surface irregularities of the workpiece 106 then under study, and of calibration edge-location store 132 are applied as inputs to localized radius of curvature and surface height mapper computer 138. Computer 138, which may be a properly programmed personal computer, employs the data applied as inputs thereto for computing the localized radius of curvature of the surface irregularities of the workpiece then under study in the vicinity of each pair of adjacent edges of the checkerboard pattern reflected from the reflective surface 104 of the workpiece 106 then under study. Computer 138 then employs the respective computed values of a set of such radii of curvature to compute a surface-height map of the surface irregularities of the workpiece 106 then under study. The operation of computer 138 will be described in more detail below in connection with FIGS. 3 and 4.

Reference is now made to FIG. 2, which shows an embodiment of sub-pixel accuracy edge-locator means 128. The operation of edge-locator means 128 is based on the following assumptions. First, it is assumed that each of the black square elements of checkerboard pattern 110 (FIG. 1a) is uniformly black, each of the white square elements of checkerboard 110 is uniformly white, and the junction between each pair of adjacent black and white or white and black square elements of checkerboard pattern 110 gives rise to a sharp edge. Second, it is assumed that the size of each of the black or white square elements of checkerboard pattern 110 is such that the size of the corresponding black or white elements of imaged checkerboard pattern 122 (FIG. 1c) is at least three periods (and preferably is in the range to 5-10 periods) of the periodically-spaced photosensitive cells of the imager of camera 100. Third, it is assumed that camera objective 108 operates as an optical linear symmetrical low-pass filter exhibiting a point-spread function sufficient to cause an imaged edge of imaged checkerboard pattern 122 on the imager of camera 100 to be spread by an amount which is never greater than that occupied by the square element of imaged checkerboard pattern 122 on the imager of camera 100, and is preferably at least three periods of the periodically-spaced photosensitive cells of the imager. The operation of FIG. 2 is also based on the mathematically proved fact that an imaged edge's proper location (i.e., the location that any given sharp edge of checkerboard pattern 110 would have on the imager of camera 100 in the absence of any spreading) occurs at the maximum absolute value of the slope of the spread imaged edge of imaged checkerboard pattern 122 corresponding to that given sharp edge of checkerboard pattern 110.

As shown in FIG. 2, the clocked-out output from camera 100 is applied as an input to linear symmetrical low-pass filter 200. Plot 202 shows the respective levels of successively clocked-out pixels at the spread out imaged-edge transition from a black-to-white adjacent elements of imaged checkerboard pattern 122. Plot 202 exhibits a positive slope. If the transition had been a white-to-black transition, the slope would have been negative. During non-transition, the slope is substantially zero.

Filter 200, which is a linear filter with a step response of the first-order time-derivative of a symmetric low-pass filter (with time delay), exhibits a characteristic LPF(t) which is a function of the camera-clock. The best choice for the characteristics LPF(t) of low pass filter 200 is one having a Gaussian shape in accordance with the following equation, wherein the parameter a defines the width of the Gaussian shape and the parameter b defines the time offset between the axis of symmetry of the Gaussian shape and the time origin, and T is the time separation between two adjacent pixels:

$$LPF(t) = \exp.\ [-a^2(t-b)^2], \quad (1)$$

in which $a = \pi/(4T)$ and $b \geq 3T$

As shown in plot 204, the output from filter 200 is a smooth curve of level values exhibiting at first a slope of rising absolute values, followed thereafter by a slope of declining absolute values. The maximum value of the slope of plot 204 occurs at the point of inflection of the curve shown in plot 204 (in which the second derivative of the output from filter 200 is zero). The output from filter 200 is applied as an input to second derivative means 206 (which may be an analog circuit comprised of 2 cascaded sets of serial resistance-capacitance combinations, as known in the art). As indicated by plot 208, the output from second derivative means 206 approaches and crosses the zero level, thereby changing polarity, at a time corresponding to the maximum slope of the curve shown in plot 204. Zero crossing detector 210, in response to a change in polarity of its input, generates pulse 212 at its output. The time of occurrence of pulse 212 defines with sub-pixel accuracy the proper location of an imaged edge.

As indicated in FIG. 2, the edge locator read-out clocks applied to locator 128 include a first clock $f_1$ occurring at the same frequency as the frame-store readout clock (but not necessarily at the same phase) and a second clock $f_2$ occurring at a frequency which is an integral multiple of the frequency of the first clock frequency $f_1$. Pixel-period counter 214 (which may be reset at the end of each read-out scan line from frame store 124 by means not shown) counts the number of pixels in the read-out scan line from frame store 124. Sub-pixel period counter 216, during each period of the first edge-locator clock, counts the number of occurrences of the second edge-locator clock, and is then reset at the end of that pixel period by the occurrence of a first edge-locator clock. Respective outputs from counters 214 and 216 provide data in digital form that is applied as inputs to tristate buffer 218.

As known to the art, a tristate buffer transfers digital data from its input to its output only in the presence of an enabling input applied thereto. Zero crossing detector 210 applies an enabling input to tristate buffer 218 only at the time of occurrence of pulse 212. At the time of occurrence of pulse 212, pixel-period counter 214 together with sub-pixel period counter 216 have registered therein a count which defines the proper location of an imaged edge with sub-pixel accuracy. Enabled tristate buffer 218 applies an output to edge-location store 130 or calibration edge-location store 132, as the case may be, defining with sub-pixel accuracy the proper location of an imaged edge.

It has been found that the embodiment of edge-locator means 128 shown in FIG. 2 is capable of defining the proper location of an imaged edge with an accuracy of less than one-percent of a pixel period. If the period of the periodically-spaced photosensitive cells of the imager of camera 100 is 16 micrometers, the proper location of an imaged edge can be determined to an accuracy of better than 160 nanometers.

Other embodiments of edge-locator means 128 are within the scope of the art. For instance, the image-pixel clocked output from camera 100 may be converted to digital form by an analog-to-digital converter; stored in frame store 124 in digital form; and read out of frame store 124 into locator means 128 in digital form. In this case, filter 200 would be a linear symmetrical digital filter (preferably employing a Gaussian kernel function) having at least three taps. The second derivative and zero crossing can then be determined by digital computation techniques.

Returning now to FIG. 1, the digital data from edge-locator means 128, representing the proper location of each of the imaged edges of workpiece 106 or of the calibration piece, may be directly stored in edge-location store 130 or edge location store 132, as the case may be. However, it is preferable to store in stores 130 and 132 the difference between the respective proper locations of each pair of adjacent imaged edges, both because the desired information is the distance between each pair of adjacent imaged edges (and not the proper locations of the imaged edges themselves) and because storing such differences requires smaller bit-capacity edge location stores (and, hence, lower cost edge location stores). In any event, digital data representing the respective distances between each pair of corresponding adjacent imaged edges of workpiece 106 and of the calibration piece are applied as respective first and second inputs to computer 138 from stores 130 and 132, respectively.

The operation of computer 138 in computing the localized radius of curvature in the vicinity of each pair of adjacent imaged edges of workpiece 106, and then computing the surface-height map from all of the computed radii of curvature over the area of selective surface 104 of workpiece 106, will now be described.

Referring to FIG. 3, there is shown a localized portion of warped reflective surface 104, which is assumed to have a positive radius of curvature (i.e., the reflected rays from a concave reflecting surface, shown in FIG. 3, converge). In FIG. 3, b represents the distance between any given pair of adjacent imaged edges of workpiece 106, a represents the distance between the corresponding pair of adjacent imaged edges of the calibration piece, and L represents the given known distance between reflecting surface 104 and the imager of camera 108 (which given known distance is permanently stored in computer 138). In the case of a concave warped reflective surface, the value b for a workpiece will be smaller than the corresponding value a for the calibration piece. To a first order approximation, the relationship among the localized radius of curvature R and a, b and L is given by the following equation:

$$\frac{a}{b} = \frac{R + L}{R - L} \quad (2)$$

Solving equation 2 for R results in the following equation:

$$R = L \frac{\frac{a}{b} + 1}{\frac{a}{b} - 1} \quad (3)$$

Computer 138 computes the value of R for each corresponding values of a and b applied as first and second inputs thereto from respective stores 130 and 132.

It will be noted that if the value of a is larger than the value of b (the case for a concave reflective surface), the algebraic value of R derived from equation 3 is positive. If the value of b is larger than the value of a (the case for a convex reflective surface), the algebraic value of R derived from equation 3 is negative (since reflected rays from a convex surface diverge).

Since (1) the only independent variable in equation 3 is the ratio a/b, (2) the respective values of a and b are determined to sub-pixel accuracy, and (3) all aberrations of the imaging means, other than those due to the surface irregularities of the workpiece, affect the images of the workpiece and the calibration piece to the same extent, the localized radius of curvature can be determined (as computed by computer 138) with very high sensitivity (i.e., a localized radius of curvature of up to 1,000 meters can be detected) and with a large dynamic range (i.e., a localized radius of curvature as small as 10 meters also can be detected). However, extremely small radii of curvature, due to sharp cracks and steps in reflective surface 104 cannot be accurately measured by the present invention.

The relationship between height distribution f(x) and the radius of curvature R(x) for small slopes in height distribution is given by the following differential equation:

$$\frac{d^2 f(x)}{dx^2} = -\frac{1}{R(x)} \quad (4)$$

Figure 4:
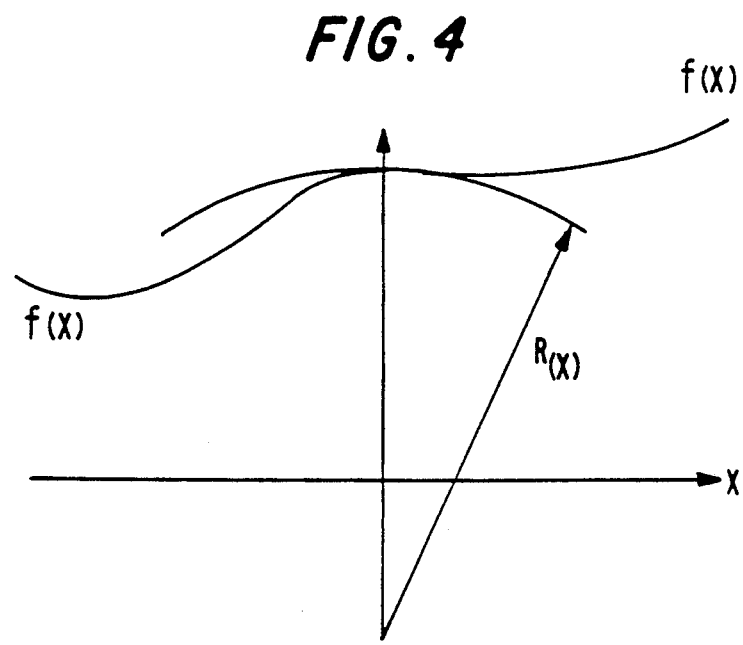
FIG. 4 is a graphical illustration of the relationship between the aforesaid localized radius of curvature at different points of the workpiece surface and a height profile map of the surface irregularities of the workpiece.

More particularly, as shown in FIG. 4, the height distribution f(x) along a given surface coordinate x of reflective surface 104 varies from point-to-point in the value of radius of curvature R(x) exhibited thereby. In the case of the imaged checkerboard pattern, discussed herein, each separate row and each separate column thereof is considered a separate surface coordinate x. Since computer 138 can compute the respective values of the radii of curvature (employing equation 3) for all the imaged square elements of each row and of each column of imaged checkerboard pattern 122 reflected from the reflective surface of the workpiece under study, the height distribution f(x) can be computed by computer 138 utilizing equation 4 by twice numerically integrating the inverted and negated respective values of the already-computed values of radii of curvature in the vicinity of the respective elements of that row or that column, as the case may be, of the imaged checkerboard pattern 122. In this manner, computer 138 can provide a profile map of the height distribution of the surface irregularities of the reflective surface 104 of the workpiece 106 then under study.

Often all that is required is a GO-NO GO test to determine whether the surface irregularities of a workpiece are within acceptable tolerances or are outside of acceptable tolerances. Then, by comparing a set of ratios of the value of the measured workpiece imaged distances to the value of the corresponding measured calibration piece workpiece distances with a set of acceptable ratio values, computer 138 can decide whether the workpiece under study is acceptable or unacceptable. Thus, it is not essential that computer 138 be capable of computing the radii of curvature or the height-profile map as discussed above. All that is essential is that the computer utilize the measured information from stores 130 and 132 as independent variables to determine as a dependent variable information about the surface irregularities of the workpiece under study.

What is claimed is:

1. An optoelectronic system exhibiting a high sensitivity and a large dynamic range for determining non-planar surface irregularities of a workpiece having a nominally plane reflective surface, said system comprising:

a television camera including a solid state imager comprised of an array of discrete periodically-spaced photosensitive cells each of which defines a pixel of an image imaged on said imager, and means for clocking out a frame of image pixels as an output from said camera;

first means for imaging on said imager a predetermined light pattern of spaced edges that has been reflected from the reflecting surfaces of said workpiece, said reflected light pattern traveling a given distance from said workpiece to said imager; and the minimum distance between adjacent spaced edges of said pattern imaged on said imager being at least three periods of said periodically-spaced photosensitive cells of said imager;

second means responsive to the respective levels of the clocked-out frame of image pixels that define the image of said predetermined pattern of spaced edges for deriving with sub-pixel accuracy data defining the spacing distance between the proper locations of adjacent imaged edges of said pattern;

third means for storing with sub-pixel accuracy data defining the spacing distance between the proper locations of adjacent imaged edges of said pattern that had been reflected from an optically flat surface of a calibration piece that has been substituted for said workpiece, whereby said reflected light pattern from said calibration piece travels said given distance to said imager; and fourth means responsive to the data from said second and third means for determining said non-planar surface irregularities of said workpiece in accordance with the relative values of spacing distance between the proper locations of correspondence adjacent imaged edges of said workpiece and of said calibration piece.

2. The system defined in claim 1, wherein:

said fourth means includes (1) means for storing data defining the value L of said given distance and (2) computer means comprised of means for solving the following equation:

$$R = L \frac{\frac{a}{b} + 1}{\frac{a}{b} - 1}$$

in which b is the value of spacing distance between the proper locations of any given pair of adjacent imaged edges of said workpiece; a is the value of the spacing distance between the proper locations of that pair of imaged edges of said calibration piece corresponding to said given pair of adjacent edges of said workpiece, and R is the value of the localized radius of curvature of the surface of said workpiece in the vicinity thereof corresponding to said given pair of adjacent imaged edges of said workpiece.

3. The system defined in claim 2, wherein:

said first-mentioned means of said computer means solves the aforesaid equation for each of a set comprised of a given plurality of different pairs of adjacent imaged edges of said predetermined pattern along a given surface coordinate x of said nominally plane surface of said workpiece, thereby providing a corresponding given plurality of localized radii of curvature values $R_{(x)}$ along said surface coordinate x; and said computer means further including means for solving by numerical integration the following differential equation;

$$\frac{d^2 f(x)}{dx^2} = - \frac{1}{R_{(x)}}$$

in which f(x) is a height profile map for said surface coordinate x of surface irregularities perpendicular to the nominally plane surface of said workpiece.

4. The system defined in claim 1 wherein:

said television camera includes an objective forming part of said first means for imaging said pattern on said imager; and said objective operates as a substantially linear symmetrical optical low pass filter exhibiting a point-spread function sufficient to blur imaged edges of said pattern by at least three periods of said periodically-spaced photosensitive cells of said imager.

5. The system defined in claim 1, wherein said first means includes projection means for projecting a light pattern including a plurality of juxtaposed contiguous given-sized elements, alternate ones of said elements being substantially uniformly black and the remaining ones of said elements being substantially uniformly white, whereby the respective junctions of black and white contiguous pattern elements comprise a predetermined pattern of edges that are periodically-spaced in accordance with said given size of said pattern elements.

6. The system defined in claim 5, wherein:

said given size of said elements is such that said distance between adjacent pairs of edges of said pattern imaged on said imager is in the range of between 5 to 10 periods of said photosensitive cells of said imager.

7. The system defined in claim 5, wherein:

said projection means projects a two-dimensional checkerboard light pattern of said given-sized elements arranged in rows and columns.

8. The system defined in claim 7 wherein:

said television camera includes an objective forming part of said first means for imaging said pattern on said imager; and said objective operates as a substantially linear symmetrical optical low pass filter exhibiting a point-spread function sufficient to blur imaged edges of said pattern by at least three periods of said periodically-spaced photosensitive cells of said imager.

9. The system defined in claim 8, wherein:

said given size of said elements is such that said distance between adjacent pairs of edges of said pattern imaged on said imager is in the range of between 5 to 10 periods of said photosensitive cells of said imager.

10. The system defined in claim 7, wherein said second means includes;

a frame store for storing the respective levels of the clocked-out frame of image pixels that define the image of said two-dimensional pattern of spaced edges; and means for independently reading respective rows of pixels from said frame store to derive therefrom with sub-pixel accuracy data defining the spacing distance between the proper locations of adjacent imaged edges of said rows of said checkerboard pattern, and (2) reading out respective columns of pixels from said frame store to derive therefrom with sub-pixel accuracy data defining the spacing between the proper locations of adjacent imaged edges of said columns of said checkerboard pattern.

11. The system defined in claim 10, wherein;

said third means independently stores with sub-pixel accuracy data defining the spacing distance between the proper locations of adjacent imaged edges of said respective rows and columns of said imaged checkerboard pattern reflected from said calibration piece; and said fourth means is responsive to the respective rows and columns data from said second and third means for independently determining for said rows and for said columns, respectively, the surface irregularities of said workpiece in accordance with the relative values of spacing distance between the proper locations of corresponding adjacent imaged edges of said workpiece and of said calibration piece for each of said rows and for each of said columns.

12. The system defined in claim 11, wherein:

said fourth means includes (a) means for storing data defining the value L of said given distance, and (b) computer means including means for independently solving each of the following two equations:

$$Rx = L \frac{\frac{ax}{bx} + 1}{\frac{ax}{bx} - 1}$$

$$Ry = L \frac{\frac{ay}{by} + 1}{\frac{ay}{by} - 1}$$

in which $b_x$ and $b_y$ are the values of spacing distance between the proper locations of any given pair of adjacent imaged edges of said workpiece of a row and of a column, respectively, $a_x$ and $a_y$ are the values of the spacing distance between the proper locations of that pair of imaged edges of said calibration piece corresponding to said given pair of adjacent edges of said workpiece of a row and of a column, respectively, and $R_{(x)}$ and $R_{(y)}$ are the values of the localized radius of curvature of the surface of said workpiece in the vicinity thereof corresponding to said given imaged edges of said workpiece of a row and of a column, respectively.

13. The system defined in claim 12, wherein; said first-mentioned means of said computer means solves each of the two aforesaid equations for each member of a first set comprised of a plurality of checkerboard pattern row and column pairs of adjacent imaged edges of said workpiece and of said calibration piece, thereby to provide a second set comprised of $R_{(x)}$ and $R_{(y)}$ values corresponding to each member of said first set; and said computer means further includes means for solving in each of two dimensions, by numerical integration of the respective values of $R_x$ and $R_y$ of said second set, the following two differential equations:

$$\frac{d^2 f(x_i)}{dx_i^2} = -R_{(xi)}$$

$$\frac{d^2 f(y_j)}{dy_j^2} = -R_{(yj)}$$

in which i designates the ordinal number of a row of said checkerboard pattern, j designates the ordinal number of a column of said checkerboard pattern, $f(x_i)$ is a height profile map of surface irregularities perpendicular to a surface coordinate along row i of the nominally plane surface of said workpiece, and $f(y_j)$ is a height profile map of surface irregularities perpendicular to a surface coordinate along column j of the nominally plane surface of said workpiece.

14. The system defined in claim 1, wherein:

said workpiece is a wafer, and said surface irregularities include warpage of the reflecting surface of said wafer.

15. The system defined in claim 14, wherein:

said wafer is a silicon wafer.

16. The system defined in claim 1 wherein said first means includes:

means for supporting said workpiece with its reflecting surface substantially in a first horizontal plane;

an optically flat mirror oriented at substantially 45° with respect to the horizontal for (1) reflecting a projected light beam of said predetermined pattern in a second substantially horizontal plane onto said reflecting surface of said workpiece and (2) and then further reflecting the reflected pattern from said reflecting surface of said workpiece in a substantially horizontal direction.

* * * * *